Jan. 9, 1923. 1,441,704.
J. NEUENSCHWANDER.
MANUFACTURE OF FLOWERPOTS, PIPES, AND OTHER HOLLOW ARTICLES OF CONCRETE.
FILED JULY 3, 1920. 2 SHEETS—SHEET 1.
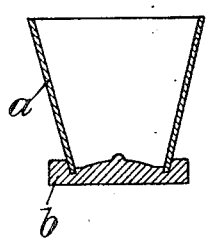
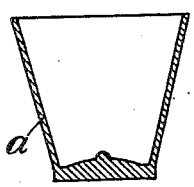
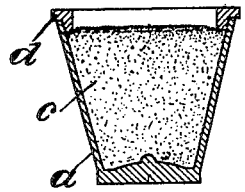
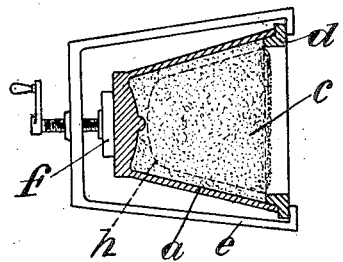
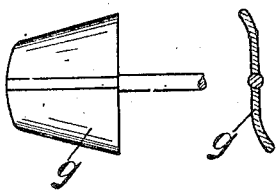
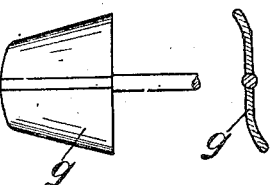
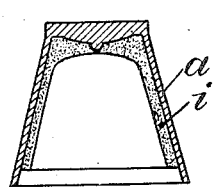
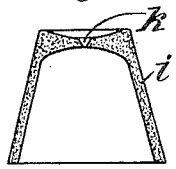
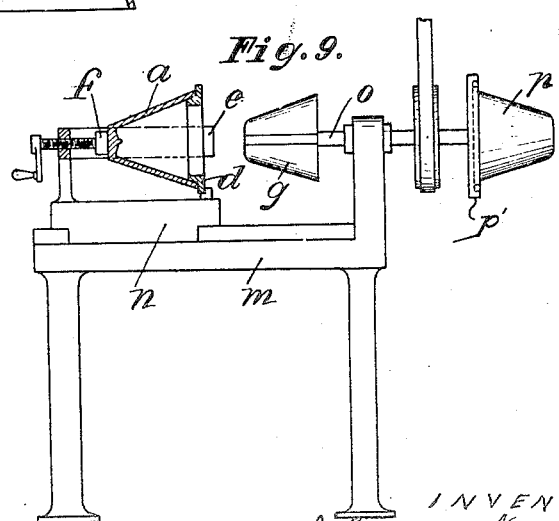
INVENTOR:
Johannes Neuenschwander
By Wm Wallace White,
ATTY

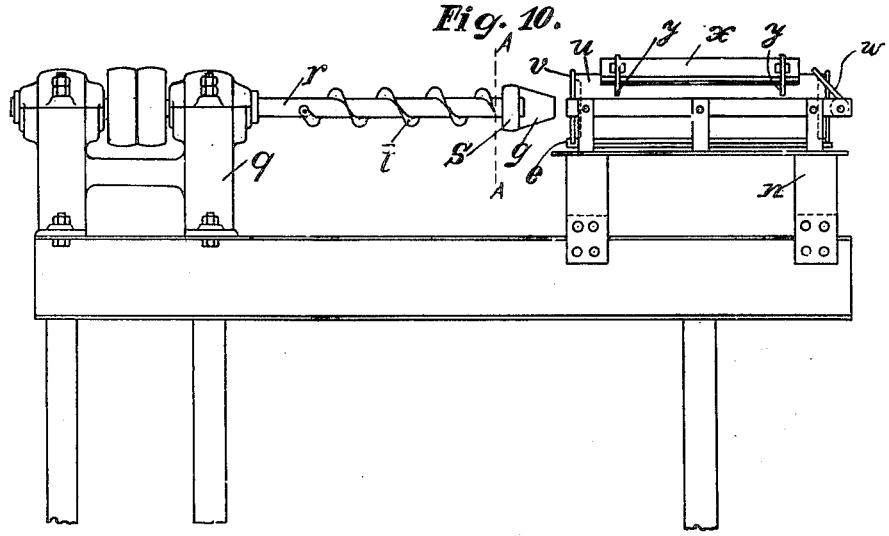
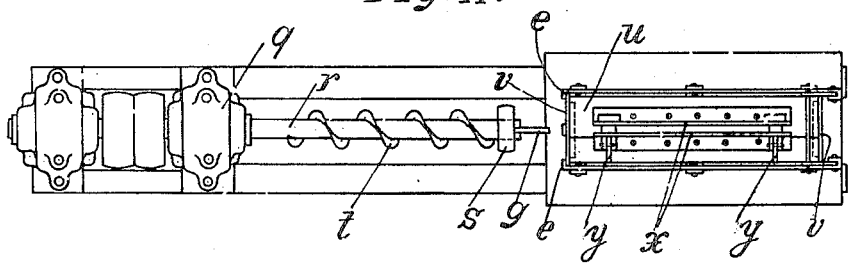
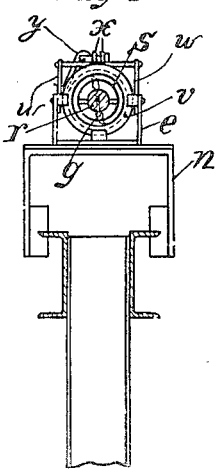
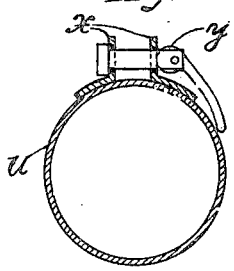

Patented Jan. 9, 1923.

1,441,704

UNITED STATES PATENT OFFICE.

JOHANNES NEUENSCHWANDER, OF NEUMUNSTER, GERMANY, ASSIGNOR TO ELLA NEUENSCHWANDER, NEE MARKMANN, OF NEUMUNSTER, GERMANY.

MANUFACTURE OF FLOWERPOTS, PIPES, AND OTHER HOLLOW ARTICLES OF CONCRETE.

Application filed July 3, 1920. Serial No. 394,010.

*To all whom it may concern:*

Be it known that I, JOHANNES NEUENSCHWANDER, a citizen of the German State, and resident of Neumunster, Germany, Grossflecken 9, have invented certain new and useful Improvements in the Manufacture of Flowerpots, Pipes, and Other Hollow Articles of Concrete (for which I have made applications for patents as follows: Germany, filed March 15, 1919; July 19, 1919; July 19, 1919; September 10, 1919; Denmark, filed December 4, 1919; Finland, filed January 12, 1920; Sweden, filed February 11, 1920; Switzerland, filed March 30, 1920; Netherlands, filed April 20, 1920; Norway, filed December 30, 1919), of which the following is a specification.

The invention relates to a method of and apparatus for the manufacture of flower-pots, pipes and other similar hollow articles of concrete.

It is already known to make hollow articles of concrete by ramming the concrete in a suitable mould around a core.

The new or improved method consists essentially in filling a hollow mould completely with concrete and then boring the central part out and pressing and smoothing the remaining portion. This method has the advantage that without the expenditure of fuel hollow articles which are usually made of clay and similar substances can be made on a large scale from an equivalent and even superior substitute. The charging of the mould and the boring after the preceding brief pressing down of the concrete can be effected so quickly, that a single workman is able to produce a very large quantity of articles in a day's shift. Flower-pots produced according to the improved method show the advantage that they are considerably more porous than flower-pots made of clay. Horticultural experiments have proved that plants grow in these concrete-pots better and quicker than in other pots.

For the manufacture of flower-pots it is advantageous to employ a special mould with a guard-ring which facilitates the manufacture of specially thin-walled articles and prevents the crumbling of the material during the boring.

The manufacture of concrete-pipes is effected in such a manner that the concrete contained in the mould is in a single manufacturing process bored out from end to end and pressed from the inside (smoothed). The interior smoothing effected by strong pressure according to this method causes that the smooth interior surface thus produced renders the pipe watertight. Its boring tool in this as in the case of flower-pots or a spade- or shovel-like boring knife may be used, which is directly followed by the smoothing ring and the conveyor-worm for ejecting the material bored out.

In the accompanying drawings apparatus suitable for carrying out the method described is shown.

In the drawings shown:—

Fig. 1 and Fig. 2 moulds for flower-pots in cross-section,

Fig. 3 the flower-pot mould with holding ring,

Figs. 4, 5 and 6 the holding device for the mould and the boring knife in side-elevation and cross-section, Fig. 7 the bored out article in the mould, Fig. 8 the ejected moulded article, Fig. 9 apparatus or appliances for boring and smoothing, Fig. 10 a machine or apparatus for boring concrete-pipes in elevation, Fig. 11 the same in plan, Fig. 12 the same in cross-section along line A—A of the Fig. 10 and Fig. 13 the pipe mould in cross-section.

The concrete employed in this method is of the usual composition of 60–70% sand and 40–30% cement or about 60% sand, 30% cement and 10% lime in a soil-damp condition. It will be readily understood that I do not confine myself to the proportions mentioned and that the ingredients of the concrete may vary within certain limits. The concrete is introduced into a mould $a$ (Figs. 1 and 2) constructed of inexpensive material (wood, sheet iron, cast iron). The mould may be provided with a detachable bottom $b$ (Fig. 1) or be made in one piece (Fig. 2). The concrete is poured into the mould $a$ filling it up entirely (Fig. 3) and is lightly rammed or pressed down. A ring $d$ corresponding in width with the thickness of the walls of the hollow articles is then put upon the mould, the said ring abutting with its overlapping edge against the inner face of a recess in the edge of the mould $a$, thus taking up an exactly central position so that when the core is bored out the thickness of the walls of the finished article is uniform throughout. The ring $d$ inserted into the mould presses with its portion which projects into the cavity of the mould upon the portion of the concrete which forms the walls of the article and supports and holds it during the boring. The mould thus prepared is then inserted into a holder $e$ (Fig. 4) by means of a press-disc $f$ so that after putting the ring $d$ on the claws in front of the holder $e$ and the press-disc $f$ on the turned bottom of the mould, an exact concentric adjustment of the charged mould is obtained by a few movements of the hands. For boring the core out of the block of concrete a spade- or shovel-like revolving boring-knife $g$ is employed (Figs. 5 and 6). The boring-knife $g$ is either moved towards and into the mould in order to effect the boring or the mould $a$ is moved against the revolving boring-knife. The boring takes place along the broken lines $h$, Fig. 4. After the bored out mould has been removed from the holder, the ring $d$ is removed and the mould is turned upside down to eject the article (Fig. 7) or it may first be smoothed by a suitable appliance or device. This device may preferably also revolve and corresponds exactly with the interior shape of the bored-out mould. The smoother $p$ is advantageously furnished with a flange $p'$ which rests upon the upper edge of the article and simultaneously smoothes this edge, see Fig. 9. The finished article $i$ with the mould in the position shown in Fig. 7 is then ejected from the mould. It now has the shape or configuration illustrated in Fig. 8 of the drawing. For the production of the usual hole in the bottom of the flower-pot, a wart $k$ or the like may be provided on the inner face of the bottom.

The ring $d$ may be omitted if the composition of the concrete is such that crumbling of the walls of the article would probably not take place. The contact or fitting surfaces or the devices for holding the mould in a central position may obviously be modified in various ways. For instance center-marks or hollow guides may be provided for this purpose. Fig. 9 shows a turn-bench (lathe) which is furnished with holding, boring and smoothing appliances for the manufacture of hollow bodies of concrete, more particularly for the production of flower-pots. In a lathe-like framework the slide-rest $n$ of the mould-holder $e$ is movably arranged in suitable guides. The holder $e$ for the mould is provided with two lateral and a lower claw and an abutment $f$ which may be adjusted by means of a screw-spindle. The abutment has a vertical front surface which comes against the bottom surface of the mould $a$ which is vertical to the longitudinal axis of the mould and which is adapted to hold the mould with its ring $d$ concentrically against the fitting surface of the claw.

The boring-knife $g$ is S-shaped in cross-section and attached to a shaft $o$ rotated by a grooved disc and carries at its other end the polishing piston $p$ which at its base is furnished with a grooved flange fitting upon the edge of the mould. The circle described by the knife $g$ and the smoothing piston $p$ corresponds with the inner shape of the article to be produced.

After the mould as described has been charged with the concrete and has been inserted into its holder $e$, the said holder together with the slide $n$ is moved by hand against the revolving knife $g$ and withdrawn again whereby the boring out of the core is effected. After the mould $a$ has been released and the press-ring $d$ removed, the mould containing the hollow article is pushed over the polishing piston $p$ which with its outer surface smoothes the interior of the walls and with its grooved flange the upper edge of the article.

The ring $d$ may be fixed to the mould-holder $e$. If it is entirely omitted in certain cases, the mould $a$ abuts with its own fitting surface against the operative surfaces of the adjusting claws $e$ or other centering surfaces.

For the manufacture of concrete pipes, the method employed is similar and the concrete contained in the mould is bored out and the remaining portion pressed (smoothed) internally so that a pipe with a perfectly smooth and polished interior surface is obtained which forms a valuable substitute for pipes made from clay as in consequence of the pressing and smoothing, and the polished surface obtained thereby the pipe is rendered perfectly impervious to water. In this regard the pipes made according to this method distinguish themselves favourably from the known pipes produced by ramming cement around a core and which possess a very rough inner surface. Furthermore the costs of the manufacture according to this boring method are much lower than those of the ramming method.

The device employed for boring consists essentially of a knife- or spade-like borer, followed directly by a smoothing ring of slightly larger diameter than the borer and adapted to smooth the piece of pipe just produced by the borer and to consolidate it while the loose material bored out escapes through the central space in the smoothing ring.

On a lathe-like frame is disposed a support $q$ for for the borer shaft or spindle $r$. The spindle carries a driving disc adjacent to the bearing in the support and at its free end a spade-like boring-knife *g* followed in the direction towards the bearing of the shaft or spindle by the smoothing ring *s* and a conveyor worm *t*.

Opposite the boring tool there is disposed upon the table of the frame the slidable rest *n* for the detachable mould which mould consists of the cylindrical shell *u* and two rings *v* adapted to be fitted on or into the shell at both ends. The mould, concentrically held by the rings *v*, is secured in holders *e* in which it is clamped or gripped concentrically to the borer axis by means of levers *w* provided with eccentric discs or cams.

The pipes are made in the following manner: the tubular mould *u* is removed from the machine and is packed with the concrete in a soil-damp condition by applying light pressure. The two rings *v* are then inserted into the mould *u* at both ends and the mould thus prepared is put into the holder *e* of the slide *n* and secured in position by means of the eccentric levers *w*. The slide *n* is now, together with the packed mould moved against the revolving boring appliance so that the boring-knife *g* penetrates into the concrete and bores the core out. The boring tool is followed by the smoothing ring *s* whose diameter is slightly larger than that of the borer and comes into intimate contact with the interior surface of the tubular body of concrete and firmly presses down the material which may have become loosened by the boring and polishes the interior surface into a smooth and bright condition. The bored out material escapes behind the smoothing ring *s* and is transported away by the worm *t*. After the boring is finished, the slide *n* is withdrawn and the mould *u* removed from it. The fitting rings *v*, which project into the mould *u* with a set-off portion the width of which corresponds with the thickness of the wall to be produced, are taken off the mould and the finished pipe may now be ejected from the mould and dried. Angle-irons *x* and eccentric levers *y* with bolts serve for locking the mould cylinder (Fig. 13).

The mould *u* is preferably made springy which may be effected by providing it with a longitudinal slit or gap.

By the smoothing ring *s* the concrete forming the wall of the pipe is strongly compressed and polished whereby a rise of temperature takes place in consequence of the friction set up and the heat developed thereby. Presumably a thin layer of chemically combined iron cement is produced during the smoothing process which compound in consequence of its great strength assists in rendering the pipe watertight. Besides the simple and inexpensive manufacture, this method of producing pipes from mineral substances has the advantage that burning of the articles is obviated so that a considerable saving of fuel is effected. The coating of the inner walls with pitch or tar necessary in pipes produced by ramming cement around a core is no longer necessary.

I do not limit myself to the details of the construction of the boring tool or the mould herein shown and described as the same may be varied in many particulars without departing from the essence of my invention. The mould may, for instance, be made in more than one piece and an expanding borer may be used.

I claim as my invention:—

1. The method of manufacturing flower-pots, pipes, and other hollow articles of concrete, consisting in filling a shell entirely with humid concrete in a soil-damp condition, boring out the unhardened core by subjecting it to the action of a quickly moved cutting tool, and drying the hollow article.

2. The method of manufacturing flower-pots, pipes, and other hollow articles of concrete, consisting in filling a shell entirely with humid concrete in a soil-damp condition, lightly ramming the concrete, pressing the rim portion of the concrete mass, boring out the unhardened core by subjecting it to the action of a quickly moved tool, and drying the bored article.

3. The method of making concrete pipes consisting in packing the humid soil-damp concrete into a cylindrical shell, boring out the unhardened core by subjecting it to the action of a quickly moved cutting tool, pressing the remainder from the inside by subjecting it to the action of a rotating, smoothing tool so that a smooth water-tight interior surface is formed, and drying the bored article.

4. Apparatus for the manufacture of hollow articles of concrete, comprising, in combination, a mold for the concrete, a ring adapted to fit into the end of said mold for determining the thickness of the walls of the article and preventing said walls from crumbling, a spade-like tool for boring out the core from the concrete mass, and means for transmitting rotary movement to said tool.

5. Apparatus for the manufacture of flower-pots, pipes and other hollow articles of concrete, comprising a mould, a ring fitting into the end of said mould, the upper part of the mould with the ring and the bottom of the mould being concentrically turned, a turn-bench, means for effecting a concentric adjustment of the mould upon the turn-bench, a rotating boring tool disposed opposite the mould on said turn-bench for boring out the core of the block of concrete contained in the mould.

6. Apparatus for the manufacture of flower-pots, pipes and other hollow articles of concrete, comprising a mould, a holder for said mould on a turn-bench, a boring tool disposed opposite said mould for boring out the core of the block of concrete contained in the mould, means for rotating said tool and means for axial movement of one of the opposite lying parts against the other.

7. Apparatus for the manufacture of flower-pots, pipes and other hollow articles of concrete, comprising a mould, a holder for said mould and for a boring tool disposed opposite said mould for boring out the core of the block of concrete contained in the mould, one part being adapted to be axially moved against the other, means for rotating the boring tool, a smoothing appliance combined with the said boring tool.

8. In apparatus for the manufacture of flower-pots, pipes and other hollow articles of concrete a mould, a holder for said mould on a turn-bench, a centering device for the mould on said holder, a boring tool rotatably mounted on said turn-bench and guides on the turn-bench to direct the movement of the holder towards the said boring tool.

9. In apparatus for the manufacture of flower-pots, pipes and other hollow articles of concrete, a mould, a holder for said mould on a turn-bench, a centralizing device for the mould on said holder, a boring tool rotatably mounted on said turn-bench, guides on the turn-bench to direct the movement of the holder towards the said boring tool and a smoothing appliance disposed upon the shaft of the boring tool.

10. Apparatus for the manufacture of pipes of concrete, comprising a spade-like boring knife carried in a lathe-like frame-work, means for rotating said boring knift, a smoothing device upon the shaft of the boring tool adjacent to the boring tool, a removable cylindrical mould provided on said frame-work, means for moving axially one of said fixed and rotating parts.

11. Apparatus for the manufacture of pipes of concrete, comprising a spade-like boring knife carried in a lathe-like frame-work, means for rotating said boring knife, a smoothing device upon the shaft of the boring tool adjacent to the boring tool, a slide on the frame-work bearing the mould and being adapted to forward the mould towards the boring-knife so as to have it transversed the whole mould longitudinally.

12. Apparatus for the manufacture of pipes of concrete, comprising a spade-like boring knife carried in a lathe-like frame-work, means for rotating said boring knife, a slide bearing a mould disposed opposite the boring tool, a smoothing ring upon the shaft of the borer adjacent to the boring tool and a conveyor worm adjacent to the smoothing ring, the boring and smoothing appliance being adapted to transverse the mould from end to end.

13. In apparatus of the class described, a tubular mould for the concrete, rings at both ends of said mould, fitting with projections into the interior of the mould, substantially as set forth.

14. Apparatus for the manufacture of pipes of concrete, comprising a spade-like boring knife carried in a lathe-like frame-work, means for rotating said boring knife, a smothing ring upon the shaft of the boring tool adjacent to the boring tool, said smoothing ring being of larger diameter than the borer, a cylindrical mould provided on said frame-work, means for moving axially one of said fixed and rotating parts.

15. Apparatus for the manufacture of pipes of concrete, comprising a spade-like boring knife carried in a lathe-like frame-work, means for rotating said boring knife, a smoothing device upon the shaft of the boring tool adjacent to the boring tool, a removable cylindrical mould provided on said frame-work, said mould being of springy material and slit longitudinally, means for moving axially one of said fixed and rotating parts.

16. Apparatus for the manufacture of pipes of concrete, comprising a spade-like boring knife carried in a lathe-like frame-work, means for rotating said boring knife, a smoothing device upon the shaft of the boring tool adjacent to the boring tool, a removable cylindrical mould provided on said frame-work, said mould being of springy material and slit longitudinally, angle-irons disposed at both sides of the slit, said angle-irons being adapted to be pressed together by means of connecting links and eccentric levers, means for moving axially one of said fixed and rotating parts.

17. Apparatus for the manufacture of pipes of concrete, comprising a spade-like boring knife carried in a lathe-like frame-work, means for rotating said boring knife, a smoothing device upon the shaft of the boring tool adjacent to the boring tool, a removable cylindrical mould provided on said frame-work, means for moving axially one of said fixed and rotating parts, a holder for said mould and eccentric levers adapted to secure the mould in the holder.

Signed at Neumunster 10, Mai 1920.

JOHANNES NEUENSCHWANDER.

Witnesses:
W. MASSDEN,
LUISE FINK.